US006286892B1

(12) United States Patent
Bauer et al.

(10) Patent No.: US 6,286,892 B1
(45) Date of Patent: *Sep. 11, 2001

(54) BASE PASSIVE POROSITY FOR DRAG REDUCTION

(75) Inventors: Steven X. S. Bauer, Yorktown; Richard M. Wood, Virginia Beach, both of VA (US)

(73) Assignee: The United States of America as represented by the Administrator of the National Aeronautics and Space Administration, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/744,414

(22) Filed: Nov. 1, 1996

Related U.S. Application Data

(63) Continuation-in-part of application No. 08/327,061, filed on Oct. 19, 1994, now abandoned.

(51) Int. Cl.[7] .................................................. B62D 35/00
(52) U.S. Cl. ........................................................ 296/180.4
(58) Field of Search ............................. 296/180.1, 180.4, 296/180.5; 180/903

(56) References Cited

U.S. PATENT DOCUMENTS

| 2,361,924 | * | 11/1944 | Boynton | 296/180.1 |
| 2,514,695 | * | 7/1950 | Dempsey | 296/180.4 X |
| 4,343,506 | * | 8/1982 | Saltzman | 296/180.2 X |
| 4,460,055 | * | 7/1984 | Steiner | 296/180.1 |
| 4,702,509 | * | 10/1987 | Elliott, Sr. | 296/180.4 |
| 4,904,017 | * | 2/1990 | Ehrlich | 296/181 |
| 4,930,834 | * | 6/1990 | Moore | 296/180.1 |
| 5,348,366 | * | 9/1994 | Baker et al. | 296/180.4 |
| 5,407,245 | * | 4/1995 | Geropp | 296/180.1 |

FOREIGN PATENT DOCUMENTS

| 0219841 | * | 6/1942 | (CH) | 296/180.1 |
| 219838 | * | 6/1942 | (CH) | 296/180.1 |
| 2149034 | * | 4/1973 | (DE) | 296/180.1 |
| 3115742 | * | 11/1982 | (DE) | 296/180.4 |
| 59334 | * | 12/1941 | (DK) | 296/180.1 |
| 0462511 | * | 12/1991 | (EP) | 296/180.1 |
| 788753 | * | 10/1935 | (FR) | 296/180.4 |
| 2509681 | * | 1/1983 | (FR) | 296/180.4 |
| 56947 | * | 9/1944 | (NL) | 296/180.1 |

* cited by examiner

Primary Examiner—Dennis H. Pedder
(74) Attorney, Agent, or Firm—Helen M. Galus

(57) ABSTRACT

A device for controlling drag on a ground vehicle. The device consists of a porous skin mounted on the trailing surface of the ground vehicle. The porous skin may be separated from the vehicle surface by a distance of at least the thickness of the porous skin. Alternately, the trailing surface of the ground vehicle may be porous. The device minimizes the strength of the separation in the base and wake regions of the ground vehicle, thus reducing drag.

7 Claims, 5 Drawing Sheets

BASE PASSIVE POROSITY FOR DRAG REDUCTION

CROSS-REFERENCE

This application is a continuation-in-part application of application Ser. No. 08/327,061, filed Oct. 19, 1994 now abandoned.

ORIGIN OF THE INVENTION

The invention described herein was made by employees of the United States Government and may be used by and for the Government for governmental purposes without the payment of any royalties thereon or therefor.

BACKGROUND OF THE INVENTION

1. Technical Field of the Invention

The present invention relates generally to controlling drag on ground vehicles, and more particularly to the passive control of drag on ground vehicles using porosity.

2. Discussion of the Related Art

Previous devices for controlling drag on ground vehicles have involved active devices which attempted to inhibit separation on the base to create a predetermined best situation. These devices consist of flaps, turning vanes, vortex generators, and a wide range of suction and blowing concepts which add considerable weight to the overall vehicle weight and increase fuel consumption.

It is accordingly an object of the present invention to control drag on ground vehicles.

It is another object of the present invention to achieve the foregoing objects with a passive device.

It is a further object of the present invention to achieve the foregoing objects with minimal spatial and mass requirements.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing a drag reduction device for use on a ground vehicle. This device consists of a porous outer skin having a thickness between about 1/16" (0.16 cm) and 1" (2.54 cm), preferably between 1/16" (0.16 cm) and 1/4" (0.635 cm), which is fixed to the trailing surface of the ground vehicle (i.e. the outer surface of the doors). The porous outer skin may be separated from the trailing surface of the ground vehicle by a distance equal to at least the thickness of the porous skin (i.e. 0.25 inches (0.635 cm) or more). The surface porosity of the porous outer skin is between about 10 and 20%. The porous outer skin may be fabricated from a porous material or by creating a number of perforations in a solid material. If the perforation method is used, the maximum dimension of the perforations is about 0.025 inches (0.0635 cm) on the sides and top of the ground vehicle and 0.25 inches (0.635 cm) on the trailing surface of the ground vehicle. Alternatively, the trailing surface of the ground vehicle may be porous. Again the surface porosity should be between 10 and 20%. The porosity may be caused by perforating the ground vehicle's existing trailing surface and, depending on the thickness of the existing surface, the maximum dimension of the perforations is about 0.25 inches (0.635 cm) for a trailing surface with a thickness of 1/2 inch (1.27 cm) or more.

DETAILED DESCRIPTION OF THE INVENTION

Figure 1A:
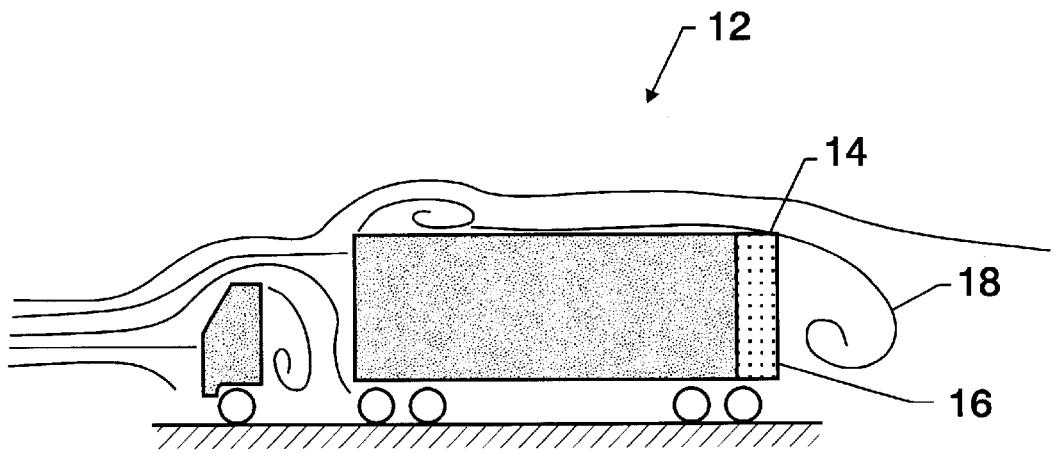
FIGS. 1(*a*) and 1(*b*) are side and top views showing a porous skin mounted on the trailing surface of a ground vehicle.
Figure 1B:
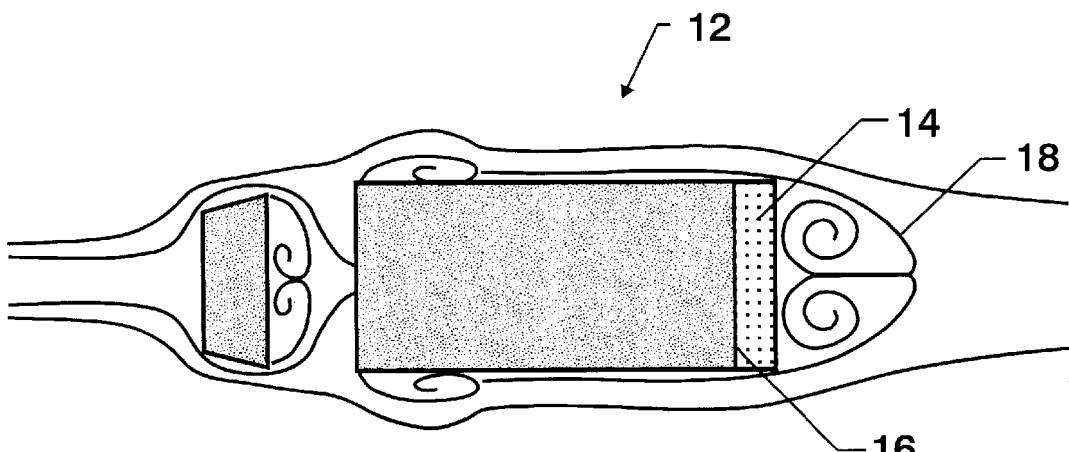
Figure 3:
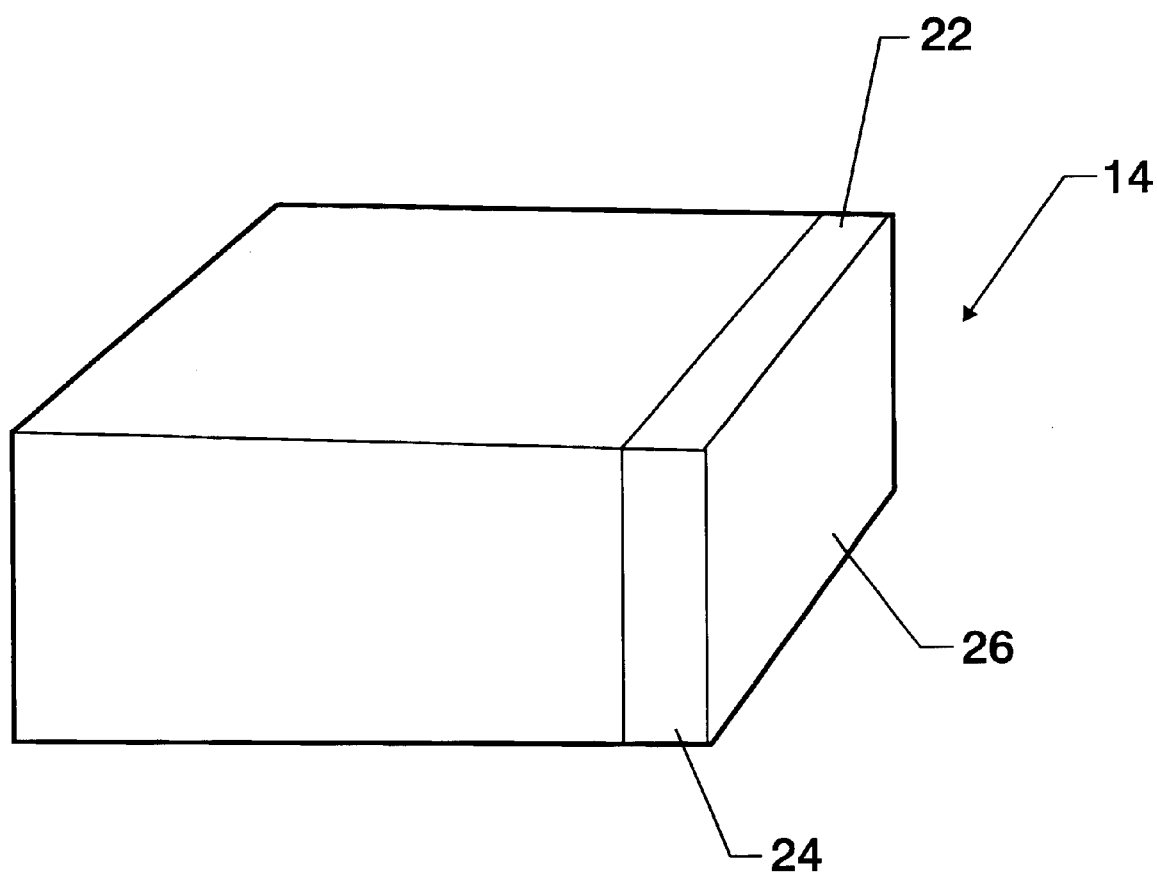
FIG. 3 is a perspective view of the trailing end of the ground vehicle.

FIGS. 1(*a*) and (*b*) show a ground vehicle 12. A trailing surface 16 of the ground vehicle 12 is covered with a porous skin 14. The thickness of the porous outer skin 14 is between about 1/16" (0.16 cm) and 1" (2.54 cm), preferably between 1/16" (0.16 cm) and 1/4" (0.635 cm) and should be chosen based on structural requirements of the ground vehicle. The porosity of the porous skin 14 is optimally between 10 and 20%. The porous skin 14 may be made from a porous material, such as sintered metal, or from a solid material, such as steel or fiberglass, which has been perforated, however the maximum dimension of the perforations should be no more than about 0.025 inches (0.0635 cm) on the sides 24 and top 22 of the ground vehicle and 0.25 inches (0.635 cm) on the trailing surface 26 of the ground vehicle (as shown in FIG. 3) in order to minimize the disturbance of the external flow field.

Figure 2A:
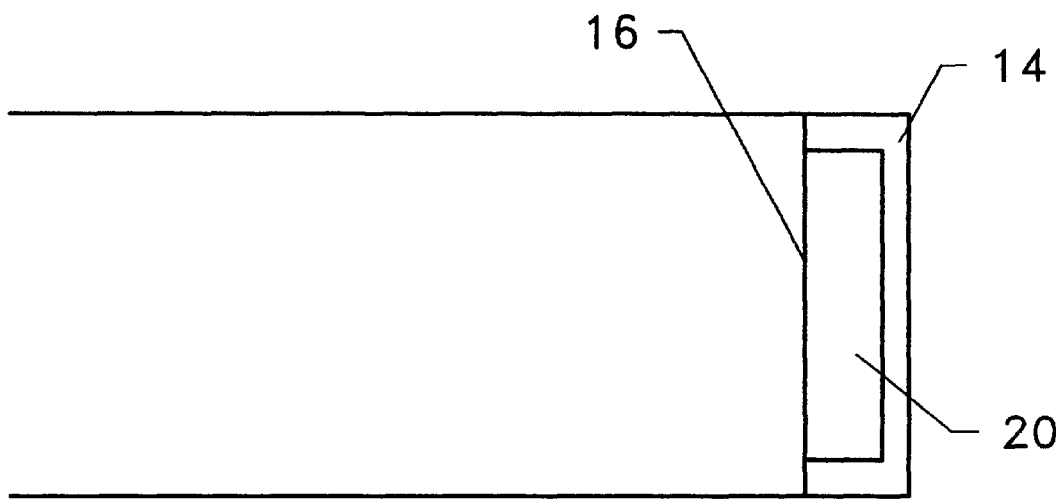
FIG. 2*a* is a cross sectional view across line II—II of FIG. 1 for a ground vehicle having a porous skin separated from the trailing surface.

FIG. 2*a* shows the porous skin 14 mounted on the trailing surface 16 of the ground vehicle, forming a plenum 20 between the porous skin 14 and the trailing surface 16. The porous skin 14 must be mounted over the plenum 20 such that there is minimal blockage in all directions. The depth of plenum 20 should be no less than about the thickness of the porous skin 14, generally about 0.25 inches (0.635 cm).

Figure 2B:
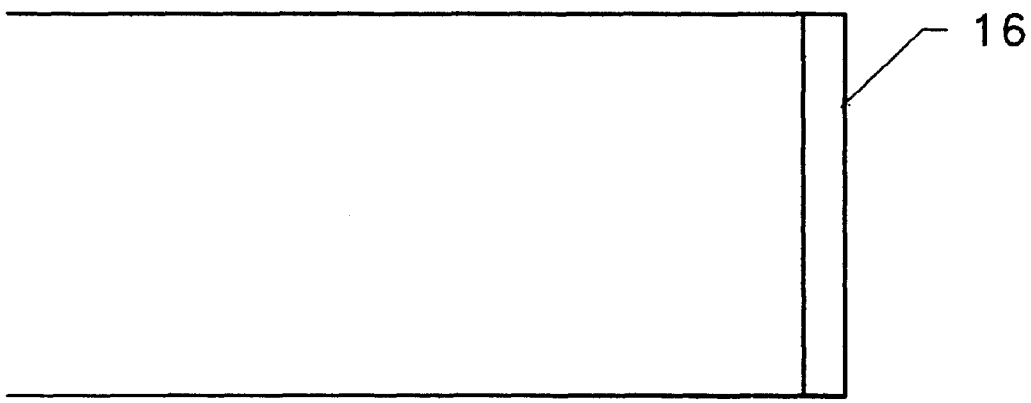
FIG. 2*b* is a cross sectional view across line II—II of FIG. 1 for a ground vehicle having a porous trailing surface.

An alternate embodiment of the present invention is to adapt the existing trailing edge 16 of the ground vehicle 12 by, for example, perforating the rear doors of the ground vehicle as shown in FIG. 2*b*. The surface porosity should be between about 10 and 20% and the size of the perforations depends on the thickness of the doors or trailing surface. For doors having a thickness of 1/2 inch (1.27 cm) or more, the maximum dimension of the perforations is about 0.25 inches (0.635 cm).

Figure 4A:
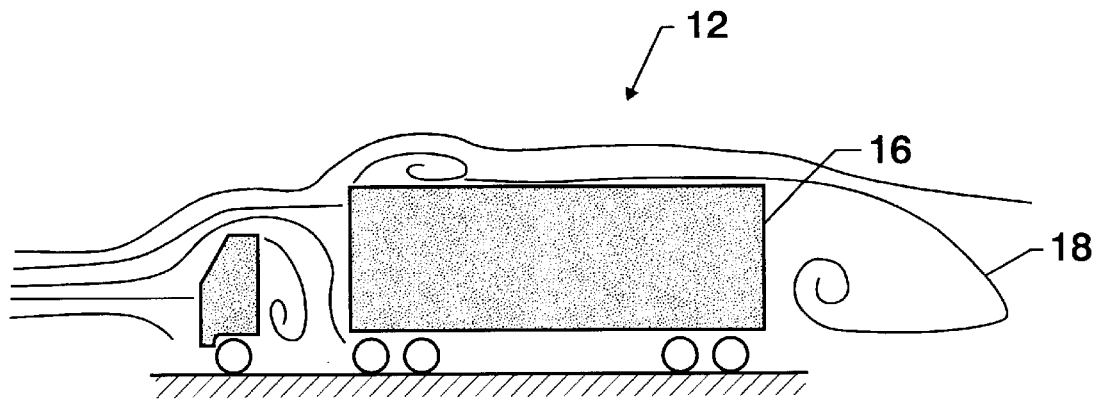
FIGS. 4(*a*) and 4(*b*) are side and top views showing the wake formed on a ground vehicle without a porous skin mounted on the trailing surface of a ground vehicle.
Figure 4B:
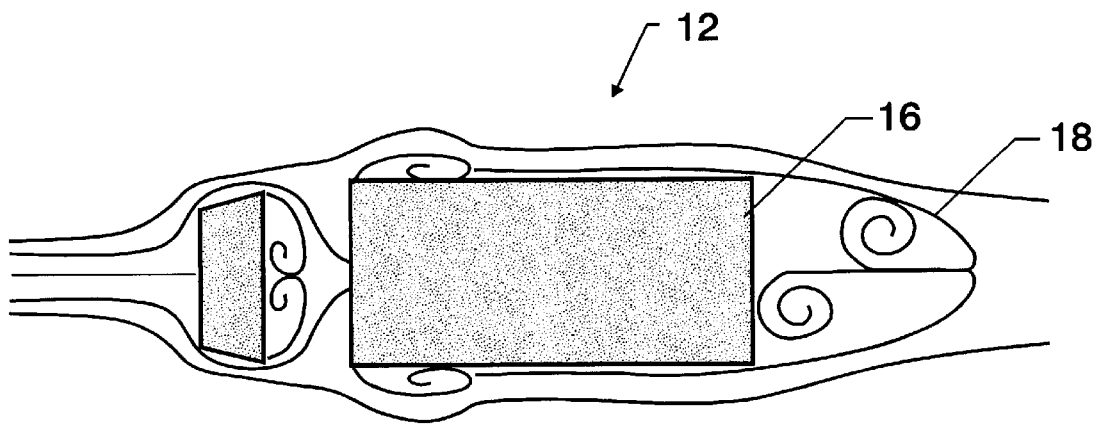

FIGS. 4(*a*) and 4(*b*) show a ground vehicle without a porous skin attached. The wake 18 is chaotic (i.e., asymmetric), larger and stronger than the wake 18 shown on FIGS. 1(*a*) and 1(*b*) which is symmetric, smaller and weaker.

This invention allows the flow over the ground vehicle 12 to turn around the corners at the base of the vehicle reducing the strength of the separation in the wake 18 of the vehicle. This allows the wake 18 to be shorter, more symmetric and reattachment of the flow in the wake 18 occurs sooner, reducing drag. This phenomenon occurs at all speeds with reductions in drag of 20% or more shown in wind tunnel tests.

Figure 5:
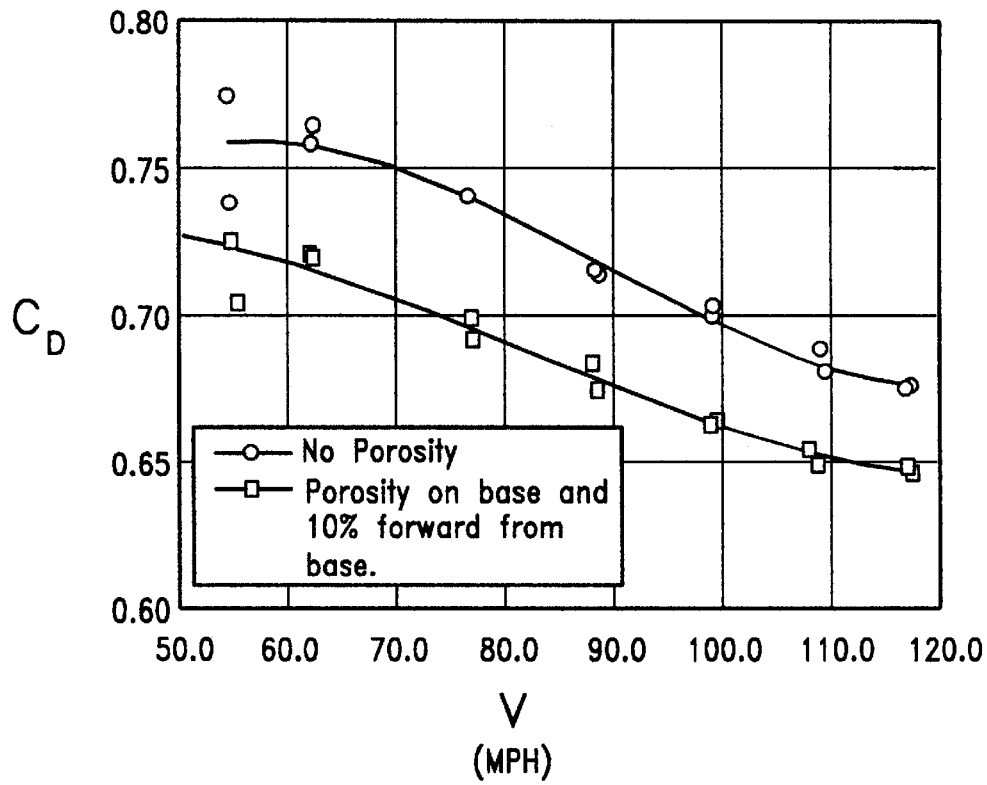
FIG. 5 is a graph showing drag characteristics of a ground vehicle having a porous skin and drag characteristics of a ground vehicle without a porous skin.

FIG. 5 shows a comparison of a tractor-trailer with a short cab and a porous skin mounted directly on the trailing surface of the trailer and extending 10% of the total length of the trailer forward of the trailing surface and a tractor-trailer with a short cab with no porous skins.

Figure 6:
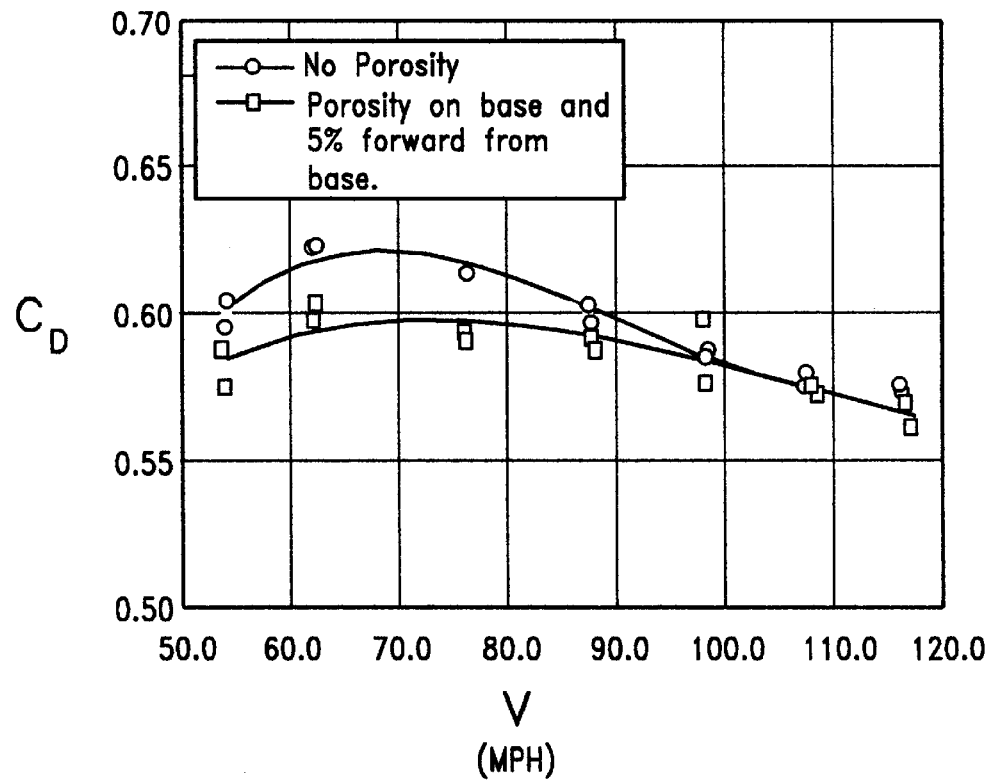
FIG. 6 is a graph showing drag characteristics of a ground vehicle having a porous skin and drag characteristics of a ground vehicle without a porous skin.

FIG. 6 shows a comparison of a tractor-trailer with an extended cab and a porous skin mounted directly on the trailing surface of the trailer and extending 5% of the total length of the trailer forward of the trailing surface and a tractor-trailer with an extended cab with no porous skins.

Many improvements, modifications, and additions will be apparent to the skilled artisan without departing from the spirit and scope of the present invention as described herein and defined in the following claims.

What is claimed is:

1. A method for reducing drag of a ground vehicle comprising the steps of:

attaching a porous skin substantially adjacent to a trailing surface of the ground vehicle, the porous skin being substantially rigid after attachment;

forming a plenum between the porous skin and the trailing surface, whereby the asymmetric character of the external trailing wake flow field of the ground vehicle is changed to a substantially steady and laterally symmetric trailing wake flow field;

wherein the porous skin comprises a first porous skin portion and a second porous skin portion; and wherein said step of attaching a porous skin to a trailing surface of the ground vehicle comprises attaching the first porous skin portion substantially parallel to the trailing surface; and said method further comprises the step of attaching the second porous skin portion substantially parallel and adjacent to the top surface of the ground vehicle.

2. A method for reducing drag of a ground vehicle comprising the steps of:

attaching a porous skin substantially adjacent to a trailing surface of the ground vehicle, the porous skin being substantially rigid after attachment;

forming a plenum between the porous skin and the trailing surface, whereby the asymmetric character of the external trailing wake flow field of the ground vehicle is changed to a substantially steady and laterally symmetric trailing wake flow field;

wherein the porous skin comprises first, second and third porous skin portions; and wherein said step of attaching a porous skin to a trailing surface of the ground vehicle comprises attaching the first porous skin portion substantially parallel to the trailing surface; and said method further comprises the step of attaching the second porous skin portion substantially parallel and adjacent to a first side of the ground vehicle, and the third porous skin portion substantially parallel and adjacent to a second side of the ground vehicle.

3. A method according to claim 1 wherein the porous skin comprises third and fourth porous skin portions, and further comprising the step of attaching the third porous skin portion substantially parallel and adjacent to a first side of the ground vehicle, and the fourth porous skin substantially parallel and adjacent to a second side of the ground vehicle.

4. A method according to claim 1 wherein the first and second porous skin portions each have a porosity within the range of 10% and 20%.

5. A method according to claim 1 wherein the second porous skin portion is attached to the top surface of the ground vehicle and extends forward from the trailing surface for a distance about 10% of the length of the ground vehicle.

6. A method according to claim 2 wherein the second and third porous skins are attached to each side of the ground vehicle and extend forward from the trailing surface for a distance about 10% of the length of the ground vehicle.

7. A method for reducing drag of a tractor-trailer comprising the steps of:

(a) attaching a first porous skin substantially parallel and adjacent to a trailing surface of the tractor-trailer, the porous skin being substantially rigid after attachment, the first porous skin having a porosity within the range of 10% and 20%;

(b) forming a plenum between the first porous skin and the trailing surface;

(c) attaching a second porous skin substantially parallel to a top surface of the tractor-trailer, the second porous skin having a porosity within the range of 10% and 20%;

(d) attaching a third porous skin substantially parallel to one side surface of the tractor-trailer, the third porous skin having a porosity within the range of 10% and 20%; and (e) attaching a fourth porous skin substantially parallel to the other side surface of the tractor-trailer, the fourth porous skin having a porosity within the range of 10% and 20%, whereby the asymmetric character of the external trailing wake flow field of the ground vehicle is changed to a substantially steady and laterally symmetric trailing wake flow field.

* * * * *